(12) United States Patent
Dhond et al.

(10) Patent No.: US 6,195,092 B1
(45) Date of Patent: Feb. 27, 2001

(54) SOFTWARE UTILITY FOR CREATING AND EDITING A MULTIDIMENSIONAL OIL-WELL LOG GRAPHICS PRESENTATION

(75) Inventors: Umesh R. Dhond, Austin; Carl J. LaSala; Jeffrey D. Rubenstein, both of Sugarland, all of TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 09/115,385

(22) Filed: Jul. 14, 1998

Related U.S. Application Data

(60) Provisional application No. 60/052,561, filed on Jul. 15, 1997.

(51) Int. Cl.[7] ....................................... G06F 3/00
(52) U.S. Cl. ................................ 345/334; 345/333; 702/6
(58) Field of Search .................................. 345/331, 333, 345/329, 340, 334; 702/6, 12, 14

(56) References Cited

U.S. PATENT DOCUMENTS

| 4,813,013 | * | 3/1989 | Dunn | .................................... 345/117 |
| 5,133,075 | | 7/1992 | Risch . | |
| 5,363,483 | | 11/1994 | Jones et al. . | |
| 5,414,809 | * | 5/1995 | Hogan et al. | ........................ 345/117 |
| 5,555,365 | | 9/1996 | Selby et al. . | |
| 5,920,828 | * | 7/1999 | Norris et al. | ........................... 702/14 |
| 6,012,016 | * | 1/2000 | Birden et al. | ......................... 702/12 |
| 6,014,343 | * | 1/2000 | Graf et al. | ............................. 367/38 |

* cited by examiner

Primary Examiner—Raymond J. Bayerl
Assistant Examiner—Cao H. Nguyen
(74) Attorney, Agent, or Firm—Gail M. Taylor-Russell

(57) ABSTRACT

A log graphics presentation editor software utility method and system for creating and editing multi-well log computer graphics presentations. This method and system comprises a presentation editor software utility with a spreadsheet-like graphical user interface. The presentation editor displays multiple oil-well log object-oriented programming graphical objects simultaneously. The user can create, edit and archive attribute values of the graphical objects; change the attributes of individual graphical objects displayed in the log graphics presentation; selectively update the attributes of associated graphical objects; automatically apply the changed attribute values to all the selected graphical objects within the presentation editor display; and archive the graphical objects and their attributes to create new log graphic presentations or to add to other log graphic presentations.

19 Claims, 12 Drawing Sheets

A ──▶ B   INDICATES OBJECT NAMED A HOLDS A REFERENCE ON OBJECT NAMED B

SOFTWARE UTILITY FOR CREATING AND EDITING A MULTIDIMENSIONAL OIL-WELL LOG GRAPHICS PRESENTATION

This application claims the benefit of United States Provisional Application No. 60/052,561, filed on Jul. 15, 1997 pending.

BACKGROUND

The invention relates generally to oil-well log computer graphics presentations and more particularly to a log graphics presentation editor software utility method and system for creating and editing multi-well log computer graphics presentations. This method and system comprises a presentation editor software utility with a spreadsheet-like graphical user interface. The presentation editor displays multiple oil-well log object-oriented programming graphical objects simultaneously. The user can create, edit and archive attribute values of the graphical objects; change the attributes of individual graphical objects displayed in the log graphics presentation; selectively update the attributes of associated graphical objects; automatically apply the changed attribute values to all the selected graphical objects within the presentation editor display; and archive the graphical objects and their attributes to create new log graphic presentations or to add to other log graphic presentations. The presentation editor allows the user to perform these operations efficiently using a spreadsheet-like graphical user interface.

In an object-oriented model of programming, problem modeling and solution is broken down in terms of the individual physical entities that exist in the problem domain. In object-oriented programming, a problem is modeled by building software entities, called objects, which represent the actual physical entities. For example, in displaying oil-well log graphics data on a computer screen, instead of concentrating on the algorithms and data needed to generate the display, the log graphics object-oriented model concentrates on the problem domain details. The oil-well log graphics computer display consists of multiple tracks, with each track representing various properties or characteristics of the oil-well such as borehole, reservoir, rock material, or rock structure properties. In translating the problem to an object-oriented representation, the physical problem domain entities, such as the tracks, are the objects. Each track object stores data representing its attributes. The objects also store procedures representing the actions the physical object is capable of carrying out. The data (or attributes) and procedures are usually hidden within the objects. Hiding the details within the objects is a major advantage of object-oriented modeling and programming because it helps to hide the complexity of the problem. It allows the programmer to concentrate on the overall system problem solution without getting lost in the working details.

However, since the attributes of each track are stored separately in each track object, this can be a disadvantage in traditional object-oriented systems when a user wishes to perform similar operations on multiple tracks, such as viewing and changing the same attributes across multiple track objects within a display. Previous systems required the user to select each track object, select the attribute of the track object and then make the change which would be applied to that particular track. This procedure would then have to be manually repeated for all the tracks within the display and can be quite time consuming. In addition, there was no easy way to archive individual graphical objects and their attributes to create new log graphic presentations or to add to other existing log graphic presentations.

The present presentation editor (PE) utility works within a Reservoir Characterization Software (RCS) System application program which provides a Petrotechical Open Software Corporation (POSC) compliant project database, enabling interactive sharing of data and integrated interpretations within such broad exploration and production (E&P) domains as geology, geophysics, petrophysics, surface modeling, reservoir modeling and reservoir engineering. The RCS system uses a Log Graphics Product (LGP) User Defined Class (UDC) graphics library to generate screen displays as well as hardcopy paper plots of single- and multi-well log interpretation results. RCS users may use other software applications as utilities (for example, WellComposite) to generate and/or edit well-log presentations.

Each log presentation can contain multiple logs displays, each log display contains multiple tracks and each track can display multiple UDC graphics objects that characterize various borehole, reservoir, rock material, or rock structure properties. Tracks are vertical columns increasing in depth or time in the vertical direction. Users can add, delete, move, or change the width of each track. Users can select a particular track and add any of the available UDC graphics objects to it, to create presentations. Users can select any graphics object by dragging the mouse over it, and clicking on it. Each graphic object in the log presentation can be modified by invoking its attribute editor (AE). Each graphics object AE is contained within a separate dialog window. The AE for any UDC object can be invoked by double-clicking on it.

Prior to the invention of the log graphics PE utility, the UDC library's user-interface for editing graphics objects within a log presentation required the user to edit one object at a time. Given the large number of graphics objects contained inside a log presentation, as well as the labor-intensive process of creating them, and invoking each of their AEs to modify them, creating a log graphics presentation is a very time-consuming task. On average, it may take the typical log analyst approximately two to two and one-half hours to create a typical single-well log presentation. The process is further slowed down by the fact that each graphics object AE is a separate dialog, so a lot of time is wasted in popping up a lot of individual AE dialog windows and popping them down.

Editing a log graphics presentation before the present PE, required a user to perform time consuming manually editing of each graphic object. When a particular attribute of the object such as track, width or curve was modified and the other tracks in the presentation also need to be altered, the user had to manually edit all the graphics objects individually.

For example in an RCS system such as GeoFrame®, changing track widths prior to the PE, using a Log Graphics Product (LGP) User Defined Class (UDC) graphics library, required the user to first select the track and then open the track AE dialog window. The user would then change the track width attribute field and apply the changed value to display the track's updated track width. Also, since the tracks are contiguous from left to right, in order for the user to widen or narrow down one track, the user also has to change the track width of many other tracks displayed within the log presentation by performing the same process by selecting each track, then opening that track's AE dialog window and then updating the track width.

Similarly, changing track positions prior to the PE, in a RCS system using a Log Graphics Product (LGP) User Defined Class (UDC) graphics library, required the user to sequentially select each track's AE and change position of each track in the log presentation.

The graphic object AE human interface lists all the editable attributes of the UDC object, out of which the user frequently edits only a few. However, the user may want to apply the same changes made in the AE to all the graphic objects in a log presentation. For example, if a user wants to edit a single attribute of ALL track curves, say change the left-scale value, prior to the PE the user had to select each of the graphical objects individually using a mouse-click, and open its AE. Then the user types in the left-scale value in the AE dialog, and hit 'OK' or 'Apply' button to have that change take effect in the presentation on screen. Since the present AE human interface cannot copy selected attributes from one graphics object to another—the user has to manually type in those attribute values each time for every object to be edited.

Prior to the PE, if the user wanted to create a new presentation, the user either had to start from scratch and create all the necessary tracks or alternatively, the user had to use another predefined presentation as a starting point, then delete the tracks that were not needed and create the tracks that were missing. There was no way to archive individual tracks, and then come back and compose a fresh presentation by picking just the required tracks without having to create them all over again.

To illustrate examples of how difficult it was for the user to edit a log graphics presentation before the PE was invented, we describe how a few basic operations were performed in the old-style of editing.

To change track widths prior to the present PE, the user had to perform the following operation. Most tracks are laid contiguously from left to right and each track has a left position and a width. When a user wanted to widen (or narrow down) one track, the user had to: Enter the "Track select" mode by clicking one of the two "mode" icons to the left of the application canvas; select the track user wanted to widen or narrow, and then pop up a track Attribute Editor (AE). The user then manually changed the width attribute in the track AE. If there were any tracks to the right of the selected track, then the user had to manually perform the same operation of selecting each track and then manually changing the width attribute in that track's AE.

If the user wanted to change track positions prior to the present PE, the user had to go through a similar series of steps in order to change the left-to-right ordering of tracks. Let's say, the presentation had 5 tracks with a L-to-R order—T1, T2, T3, T4, and T5. Suppose, the user wanted to change the L-to-R order of the tracks to—T1, T3, T2, T4, T5. The user would first have to invoke the T3 AE; change the left position of T3 to that of the left position of T2, and manually apply the change by selecting either an "OK" or "Apply" command button; invoke the T2 AE, and change its left position to T3's left position plus T3's width, and manually apply the change by selecting an "OK" or "Apply" command button.

A graphic object's attribute editor exposes all of its editable attributes or properties. However, most users commonly edit only a small set of attributes 80% of the time, repeatedly. If a user wanted to edit a single attribute of ALL curves prior to the present PE, for example the left-scale value, the user had to select each of the curves individually using a mouse-click, and open its AE. Then the user has to type-in the left-scale value in the AE dialog, and manually apply the change by selecting a command icon to have that change take effect in the presentation on screen.

Individual tracks from different presentations could not be used to create a new presentation prior to the present PE. An entire presentation could be saved for later use, but an individual presentation track could not be saved and later used to compose a different presentation.

Therefore, there is a need for a graphics display editor for the efficient creating, editing and archiving of log presentation data that allows a user to edit multiple graphics objects simultaneously in one display, update the attributes of other graphics objects in the log presentation displays automatically when an attribute is changed in a related graphic object, and archive individual graphic objects in a library that a user can access to create new log presentations or to augment existing log presentations.

SUMMARY

The method and system of the present invention solves these problems by providing a Presentation Editor (PE) that allows a user to edit multiple graphics objects simultaneously in one display, update the attributes of other graphics objects in the log presentation displays automatically when an attribute is changed in a related graphic object, and archive individual graphic objects in a library that a user can access to create new log presentations or to augment existing log presentations. The PE has a spreadsheet type display interface that allows the user to create and edit an entire log presentation from within the same dialog window.

To widen or narrow tracks in Track PE mode: When the user changes the width of one track and hits 'Apply', all other tracks automatically reposition themselves to accommodate the changed track width of the track being edited. This saves the user many manual steps that the user would otherwise have had to do as discussed above.

To reorder tracks: The Track PE user interface has up-and-down arrow buttons that the user can use to reshuffle the ordering of tracks with one mouse-click. If the user wants to change track position as discussed above, the user selects track T3's row, click the 'up arrow' button, and hit 'Apply'. The previous UDC AE paradigm would have required a large number of mouse-clicks to achieve the same effect, whereas the PE does it in two mouse clicks. The PE effectively saves the user from having to open each individual track AE and change the track positions manually.

The graphical user interface is polymorphic. When the user chooses the "Object Type" from the option menu, the PE changes its user-interface and behavior so as to allow the user to edit all LGP UDC objects in the presentation under the selected track(s) and of the selected "Object Type". An object type refers to a description of the behavior of an object of a certain kind, like logs, tracks or curves. For example, the Igp_Curve type referes refers to a Log Graphics Product (LGP) User-Defined Class (UDC) type which has graphical attributes (or properties) like code, left scale and right scale. Whenever a description of a software product refers to an Igp_Curve type, it is referring to the general category of LGP UDC type objects which have a code, left scale and right scale as properties. In object oriented programming, there exists a hierarchy of types. There is a base type which describes some general properties. Derived from this base type are one or more subtypes. A subtype inherits properties and behaviors of the base type. The subtype may add some properties and/or behaviors and can override and/or modify the base type behaviors. Whenever the software creates a particular object of a particular type, the object resides in memory and is referred to as an instance of that type. In the present example, if the current "Object Type" is 'Curve', the PE changes itself to become a 'Curve PE', with each row presenting a user-interface that allows the user to edit a different curve UDC object inside the log presentation. This saves the time of selecting of all the individual editor dialogs for the individual objects being edited.

One stop editing is provided. A user can navigate through and edit the entire log presentation—log displays, tracks, and UDC graphic objects—from the PE dialog. The user doesn't have to visually search in the presentation display for the graphic object and rely on the accurate positioning of the mouse on the object in order to be able to select the object (s)he wants to edit. With the PE, the user can first select the objects to be edited using the "Object Type" and "Track" option menus. The PE provides a convenient one-line editor interface for each selected object. The user can then directly edit the attribute (s)he wants to change and hit 'OK' or 'Apply'.

A copying feature is provided. If the user wants to copy a graphical attribute from one graphic object to another, there was no way in the previous systems except to pop up the target object's AE and hand-type the new attribute value in it. In the PE, the user can click on the source object's graphical attribute, hit copy, select the target object, and hit paste. That pastes the copied graphical attribute value from the source object to the target object.

A propagate feature is provided. If the user wants to change a few selected attributes of a large number of graphic objects, the old editing method would have required the user to edit them one object at a time, as discussed above. With the PE, the user can select a source object from which the user could select a few attribute values and hit the "Propagate" button. This pops up a "Propagate" dialog that allows the user to choose from a list of graphical attributes of the source object that can be "copied". It also allows the user to select a number of target graphical objects, objects which can receive the values of the "copied" attributes. The user can thus change a number of attributes of a number of graphics objects at once with the "Propagate" mechanism.

The user can archive and reuse tracks. The PE has the capability of saving individual track objects from a presentation. The user can therefore create a favorite track repository. These tracks can then be retrieved as needed to either create a new presentation or append to an existing presentation. When it is time to create a new presentation, and the user has all the necessary component tracks saved in the repository, the user does simply selects the required tracks and imports them into a blank presentation to quickly create a new presentation. For example, a presentation P1 has tracks T_x, T_y, T_z, and presentation P2 has tracks T_m, T_n, T_o, and T_p. Let's say the user now has a need to create a third presentation P3 with tracks T_y, T_z, T_n, T_o, and T_p. With the PE, the user just has to import the necessary tracks and construct a new presentation P3. Without the PE, individual tracks could not be saved, so the user had to start from an existing presentation like P2, cut out the track T_m, and then re-create tracks T_y and T_z from scratch.

The present invention comprises a computer-implemented method of editing the attribute values of object-oriented programming graphical objects in an oil-well log graphics display comprising the steps of: providing a presentation editor computer display, with a spreadsheet-like graphical user interface (GUI) display and a set of command functions, the presentation editor being selected by a user from an oil-well log display; displaying multiple oil-well log graphical objects concurrently within the spreadsheet-like graphical user GUI display of the presentation editor; displaying attributes of the multiple oil-well graphical objects within the spreadsheet-like graphical user GUI display of the presentation editor; changing the attribute values of a graphical object in response to a user selecting the attribute to be changed and selecting a command from the set of command functions; and automatically applying the changed attributes to the multiple oil-well graphical objects, selected by the user, displayed within the presentation editor computer display.

User selected attributes may be copied from a first graphical object to one or more target graphical objects displayed within the presentation editor computer display by the user first selecting the attributes of the first graphical object, selecting one or more target graphical objects, and using a command function, copying the attributes to from the first graphical object to the selected target graphical objects. The multiple graphical objects may be track object types. The command functions may be represented on the presentation editor screen as icons and are selected from the group consisting of add track, import track, propagate, and save track. The track object type may have attributes selected from the group consisting of track depth, track width, and track position. The invention further comprises the capability of automatically updating the attributes of multiple track object when the user changes the track depth, track width and track position attribute of one graphical object within the presentation editor computer display.

User selected track object types and their attributes may be saved from a first oil-well log display, in response to a user selecting a save track command function within presentation editor computer display.

A new oil-well log graphics display may be built by inputting saved track object types and their attributes into the presentation editor display in response to a user is selecting an add track command function in the presentation editor computer display.

Saved track object types and their attributes may be added to an existing oil-well log graphics display by using the presentation editor computer display in response to a user selecting an add track command icon.

A user may be allowed to edit an entire oil-well log display consisting of log displays, tracks and user defined class graphical objects and their attributes in the spreadsheet-like graphical user interface within the presentation editor computer display.

The multiple graphical objects may be grid object types. The grid object type may have attributes selected from the group consisting of orientation, type, line thickness, and line increment.

The present invention comprises a method of editing the attributes of a graphical object in an object-oriented computer program running on a computer processor, the method comprising the steps of: allowing multiple user defined class (UDC) graphical object types, each object type having associated attributes; providing a presentation editor computer display for each graphical object type; and using each presentation editor, with a graphical user interface as an interface with a user, to allow the user to selectively create and modify the attributes of multiple UDC graphical objects of each object type within a single presentation editor display.

The graphical object types may be selected from the group of graphical object types. The object types may consist of track, grid and curve object types and each presentation editor is selected from the group consisting of a track presentation editor, a grid presentation editor and a curve presentation editor. The user may selectively create and modify the attributes of multiple graphical objects selecting a first graphical object and copying those attributes to one or more target graphical objects when the user selects a propagate command on the presentation editor computer display. The user may also selectively create and modify the attributes of multiple graphical objects by the user selecting a first graphical object and then copying those attributes to a target graphical object when the user selects an apply command on the presentation editor computer display. The user may be allowed to save particular instances of graphical object types and their attributes, input saved instances of graphical object types into the presentation editor display and add the instances of graphical object types to existing graphical objects in the presentation editor display, and input instances of the saved graphical object types in the presentation editor's graphical user interface to build a new display of graphical objects in the presentation editor display.

The attributes of a graphical object may be changed in response to a user selecting the attribute and selecting a command from a set of command icons. For example, the curve type object type may have attributes selected from the group consisting of curve type, curve data binding, curve scale and curve line.

The present invention comprises a system creating, editing and archiving the attribute values of a graphical object comprising a specially programmed computer. The specially programmed computer has a memory means for storing a user defined class graphics library of objects, each object in the user defined class graphics library of graphical objects having a plurality of attribute values; a database for archiving instances of graphical object types and their attribute values; and an application software program with an interface to the user defined class graphics library of objects and the database. The specially programmed computer has a processor means for generating the user defined class graphics library of objects using the application software program and displaying the instances of the graphical object types stored in the database on a display and running a presentation editor that interfaces with the application software program, the user defined class graphics library of objects and the database. The specially programmed computer has a graphical user interface means for displaying multiple instances of graphical object types on a spreadsheet type display within a presentation editor computer display and allowing the user to selectively create and modify the attribute values for multiple instances of graphical object types of the same object type within a single presentation editor computer display.

BRIEF DESCRIPTION OF THE DRAWINGS

These and other features, aspects, and advantages of the present invention will become better understood with regard to the following description, appended claims, and accompanying drawings where:

DETAILED DESCRIPTION

The design of the Presentation Editor (PE) is "portable". The PE has been implemented as a shareable library that can be attached to any software application that uses User Defined Class (UDC) graphics objects for displaying well log presentations. The PE look changes to allow the user to edit all types of UDC graphics objects.

Figure 1:
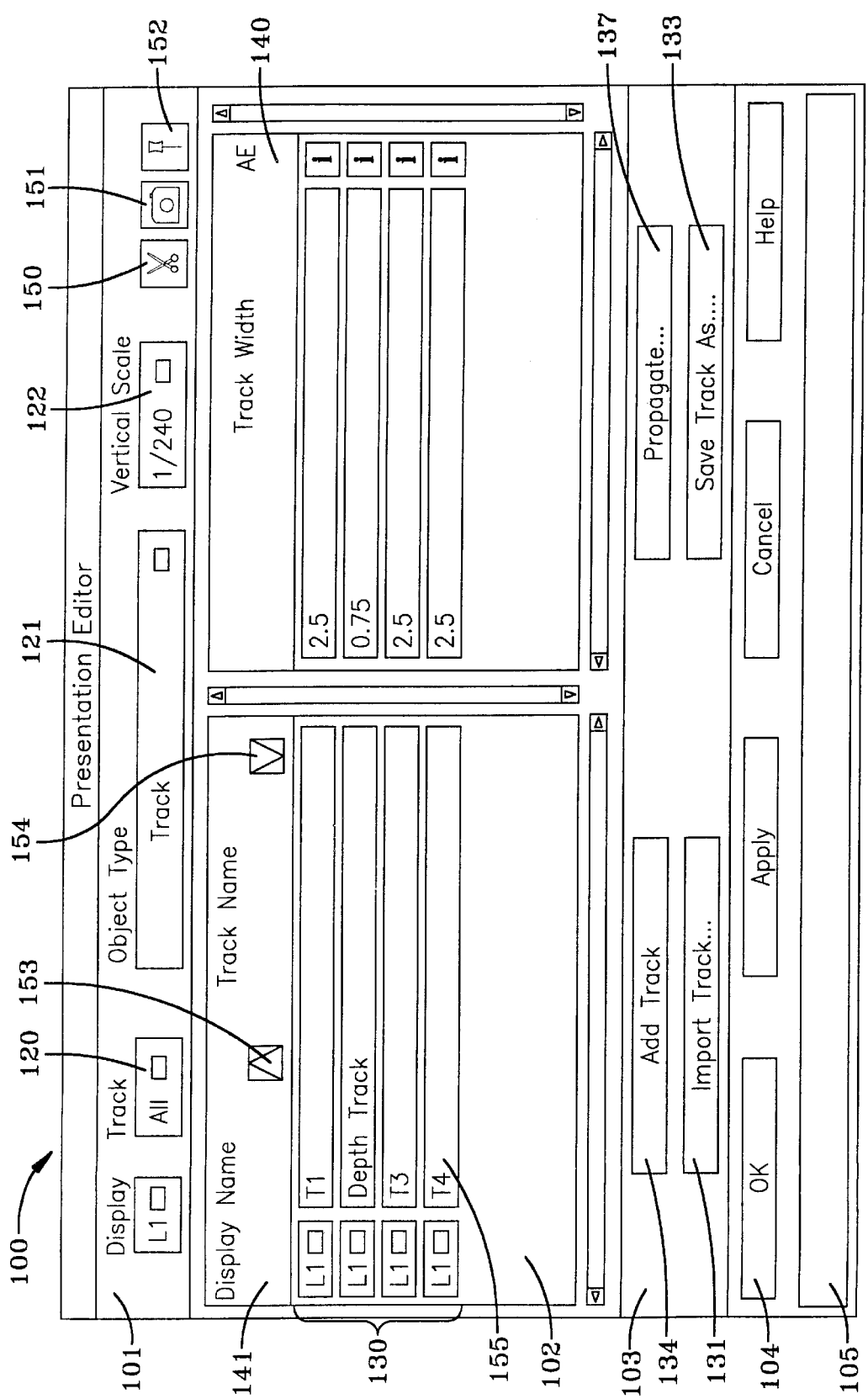
FIG. 1 shows a track presentation editor computer display in accordance with the present inventive concept.

Turning now to FIG. 1, a preferred embodiment of the track PE computer display in accordance with the present inventive concept 100 is shown. On the log graphics computer display which is shown as FIG. 4, the user selects the PE icon 401 and the PE is displayed. When the user chooses the Object Type 'Track' 121 in the top control work area 101, as shown in FIG. 1, the PE becomes a Track PE 100. Inside the Track PE 100, the 'Work area' 102 displays rows of track editors 130. All tracks 120 are selected for display within the work area 102. There is one track editor per row. Working with the track editors 130, the up-and-down arrow buttons 153–154, the cut button 150, the bottom control area 103 and the command bar 104, the user can add, delete, and move tracks belonging to the presentation using a track editor 130 for that track. The user can select a track by clicking on the track name in a row 155 and invoke the add track function 134, the import track function 131, the propagate track function 137 or the save track function 133 in the bottom control area 103. The add track function 134 adds a track to the log presentation display of FIG. 4. The import track function 131 imports a saved track and adds it to the log presentation display of FIG. 4. The propagate function 137 takes the changes the user has made in the track PE 100 and propagates the changes to all the tracks. For example, if the user changes the track width attribute 140 displayed in the work area 102 and selects the propagate function 132, the track width attribute of all the tracks displayed in the track display widow 141 of the work area 102 changes.

Figure 2:
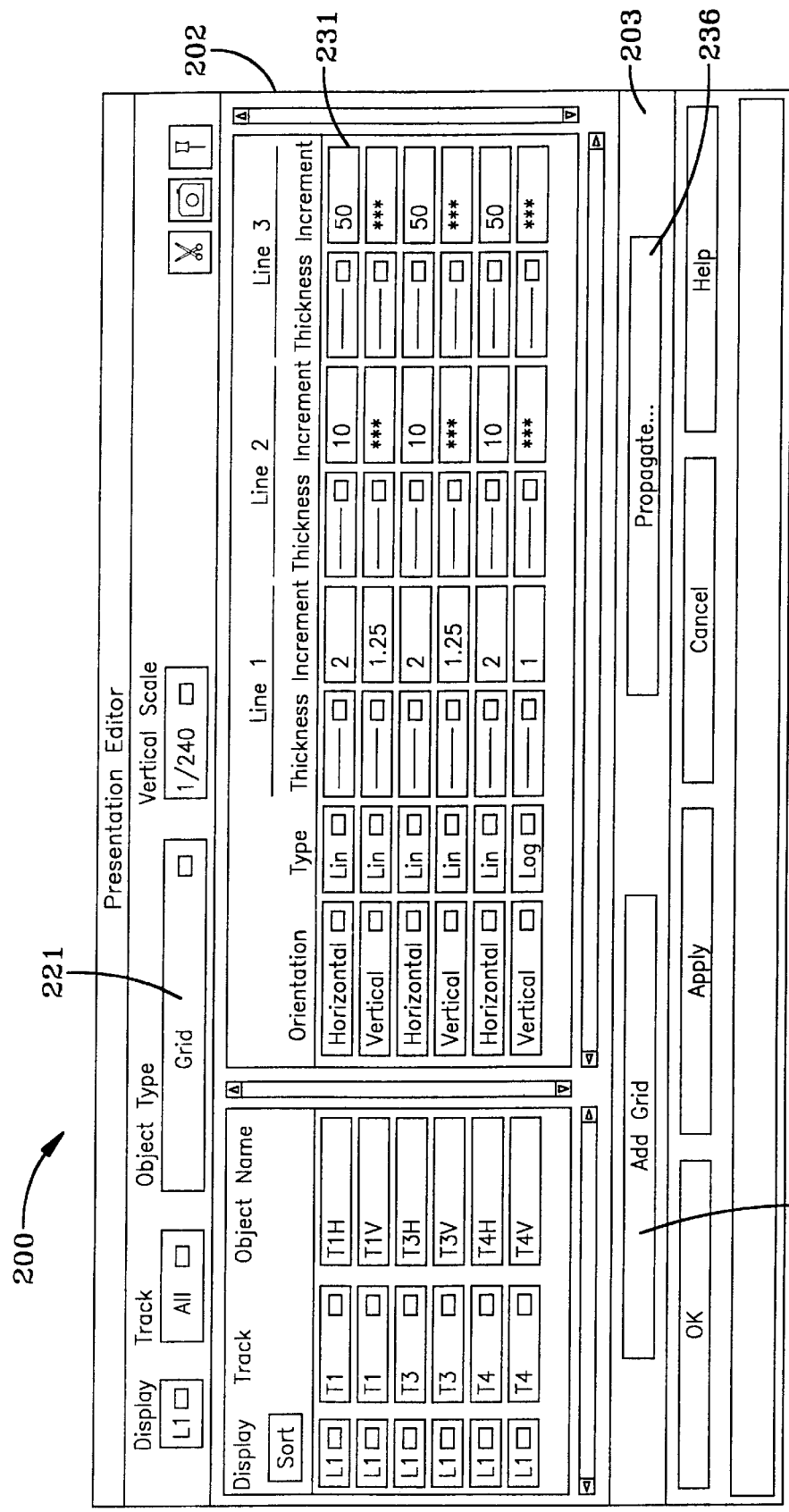
FIG. 2 shows a grid presentation editor computer display in accordance with the present inventive concept.

After the user has added the necessary tracks in the track PE 100, the user could select Object Type 'Grid' 221 as shown in FIG. 2, and the PE changes itself into a Grid PE 200, with one grid editor human-interface per row 231 in the work area 202. each grid editor row 231 allows the user to make the most commonly needed changes that the user might want to make without popping up another secondary dialog. For example, if the user wants to change the line-style, line-thickness or line-color attributes of a grid line, it can be changed from the grid PE 200 with an option menu rather than pop up yet another line-style selector or line-color selector dialog box. In addition, the user can select the add grid function 235 and the propagate grid function 236 in the bottom control area 203. The add grid function 235 adds the grid selection to the log presentation display of FIG. 4. The propagate grid function 236 takes the changes the user has made in the grid PE 200 and propagates the changes.

Figure 3:
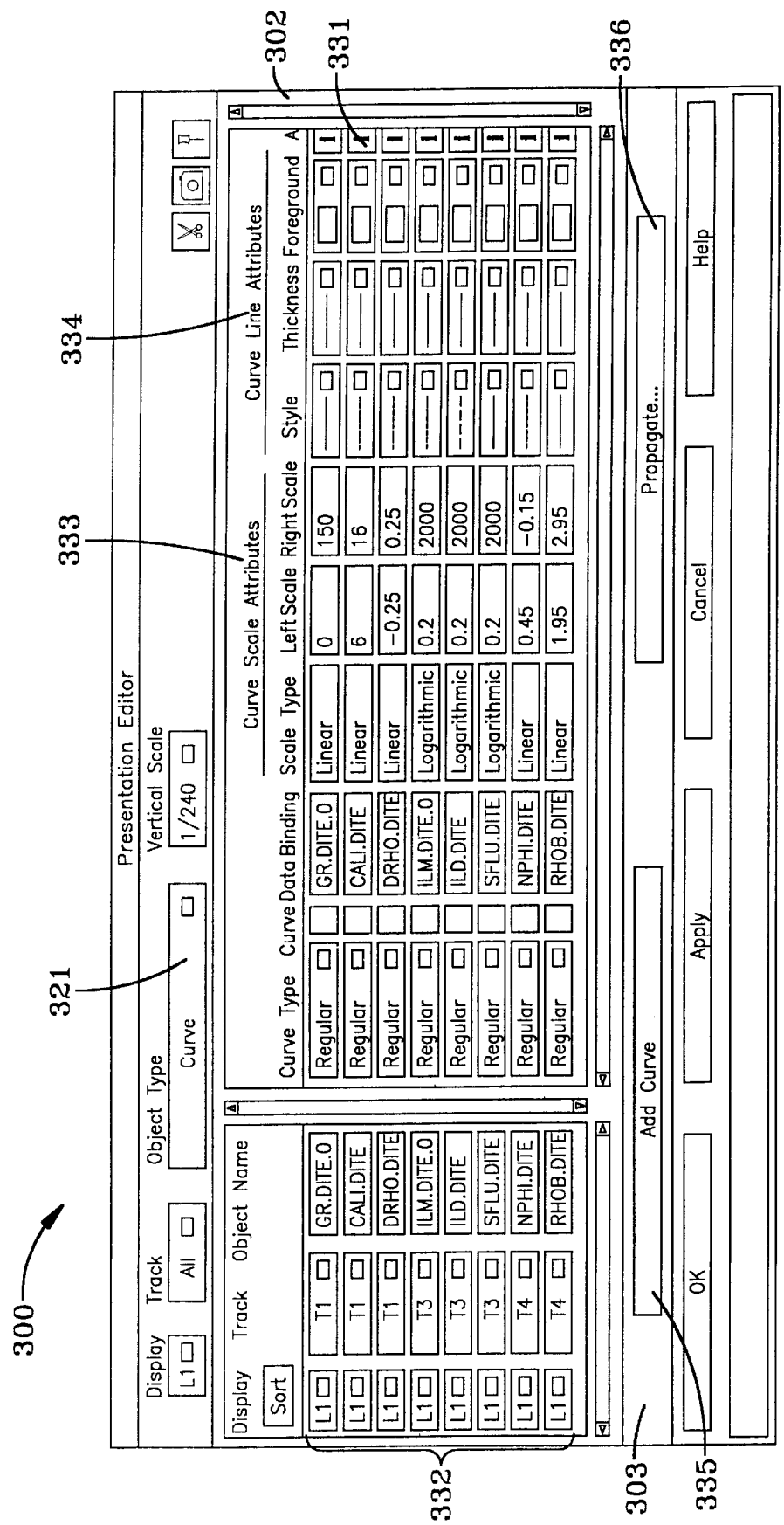
FIG. 3 shows a curve presentation editor computer display in accordance with the present inventive concept.
Figure 4:
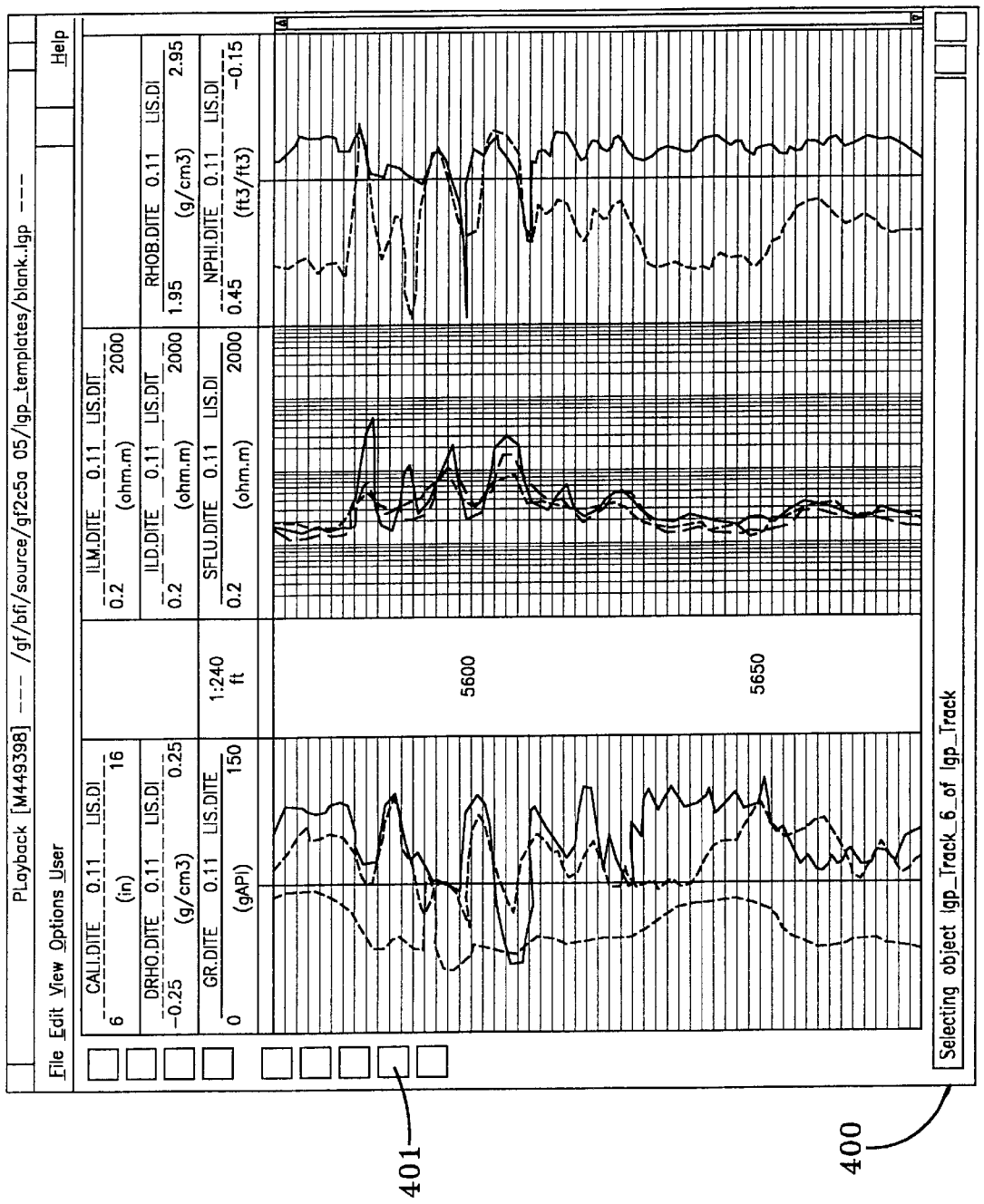
FIG. 4 shows a log graphics computer display presentation created using the presentation editor in accordance with the present inventive concept.

Turning now to FIG. 3, a preferred embodiment of the curve PE computer display in accordance with the present inventive concept 300 is shown. After the user has added the necessary tracks in the track PE 100, the user could select Object Type 'Curve' 321 as shown in FIG. 3, and the PE changes itself into a Curve PE 300, with one curve editor human-interface per row 331 in the work area 302. Multiple tracks 332 are displayed within the work area 302. If a user wants to change the curve scale attributes 333 or the curve line attributes 334, they can be changed from the curve PE 300 with an option menu rather than having to pop up another dialog box. In addition, the user can select the add curve function 335 and the propagate curve function 336 in the bottom control area 303. The add curve function 335 adds the curve selection to the log presentation display as shown in FIG. 4. The propagate curve function 336 takes the changes the user has made in the curve PE 300 and propagates the changes to other curves.

Turning now to FIG. 4, a preferred embodiment of the log graphics computer display presentation 400, created using the PE, in accordance with the present inventive concept is shown.

The PE may be developed in any software programming language that supports object-oriented design and programming techniques. The preferred embodiment of the present PE is developed in the C++ programming language using object-oriented design and programming techniques. The PE implementation uses the following well-known object-oriented design patterns: Factory, Composite, and Model-View-Controller.

Figure 5:
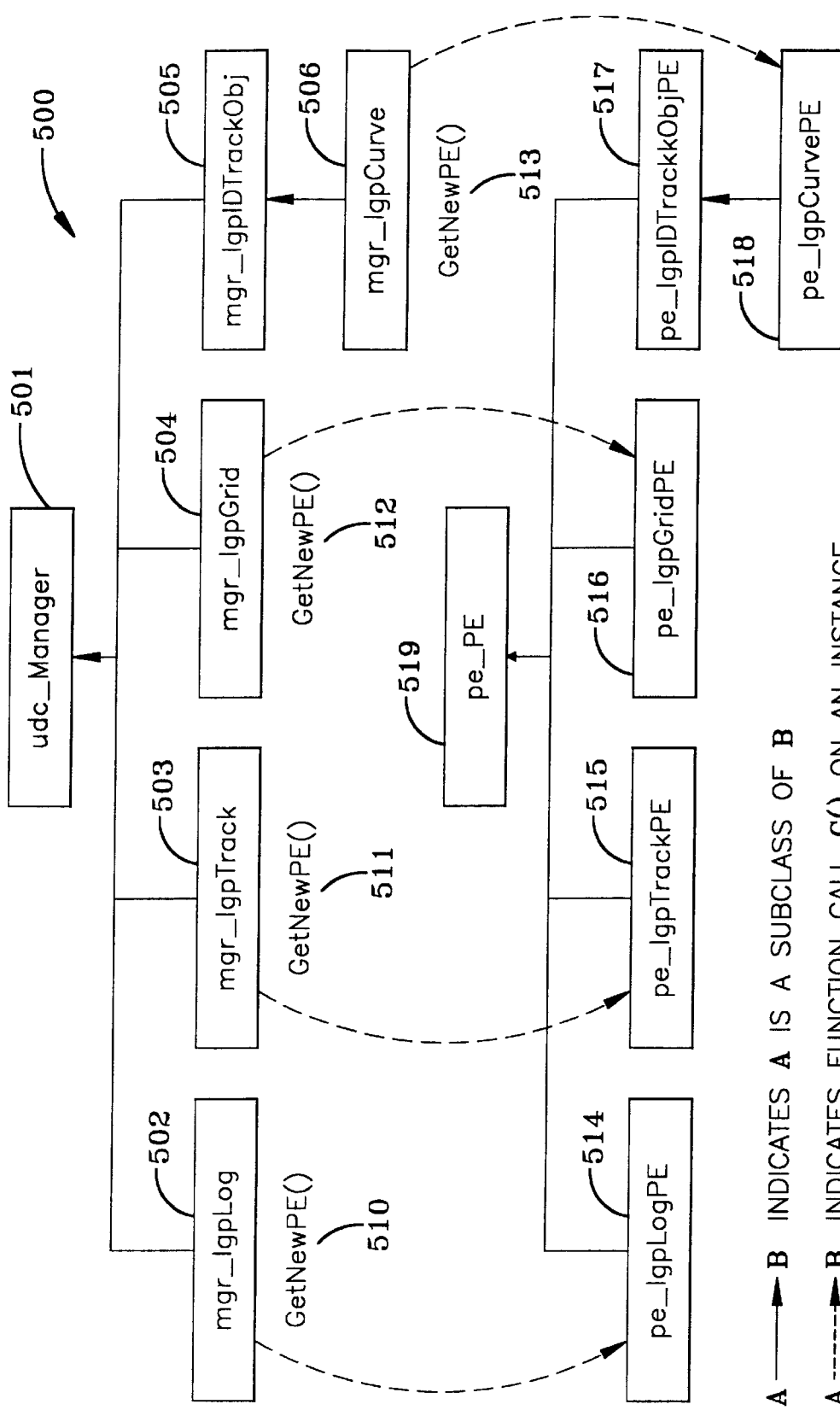
FIG. 5 shows an object-oriented design representation of the presentation editor using the Factory design pattern in accordance with the present inventive concept.

FIG. 5 shows an object-oriented design representation of the PE using a Factory design pattern 500 in accordance with the present inventive concept. The udc_Manager 501 is the Log Graphics Presentation (LGP) library equivalent of a "Class Factory" (see Gamma et al) associated with an LGP User Defined Class (UDC). The udc_Manager 501 presents a common public interface to its users to create a new PE for a given graphical object. The udc_Manager 501 is an abstract base class, and one of its interface functions is GetNewPE( ) 510, 511, 512 and 513 which display a PE based upon the object type client selected. Any client of the udc_Manager 501 can use GetNewPE( ) 510–513 to create a new PE instance based upon the object type client selected.

Any client (software application) can use the udc_Manager 501 to obtain a PE for a graphic object belonging to a particular class by sending a GetNewPE ( ) 510–513 request to that class's udc_Manager subclass (such as mgr_IgpLog 502, mgr_IgpTrack 503, mgr_IgpGrid 504, and mgr_Igp1DTrackObj 505 with its subclass mgr_IgpCurve 506). For example, at the application level, any application that uses LGP UDC graphics knows about the log graphics objects in its presentation. The well-log domain object instances are represented by instances of the Igp_Log class. The application first obtains the 'factory' object (udc_Manager 501) associated with the Igp_Log class, which would be an instance of class mgr_IgpLog 502, a concrete subclass derived from the abstract base class udc_Manager 501. The application then calls the public interface function GetNewPE( ) 510 on the Igp_Log's 'factory' (mgr_IgpLog 502) in order to obtain the log PE for its use. Each LGP UDC, like the track (Igp_Track), the grid (Igp_Grid), or curve (Igp_Curve), in turn, has its own 'factory': mgr_Igp_Track 503, mgr_Igp_Grid 504, or mgr_Igp_Curve 506. When the log PE (class pe_IgpLogPE 514) enters a certain object mode (like the Track mode pe_IgpTrackPE 515, Grid mode pe_IgpGridPE 516, or Curve mode pe_IgpCurvePE 518), it, in turn, becomes a client, accesses the 'factory' (udc_Manager) object associated with that mode, and sends a GetNewPE( ) request 510–513 to that object.

Figure 6:
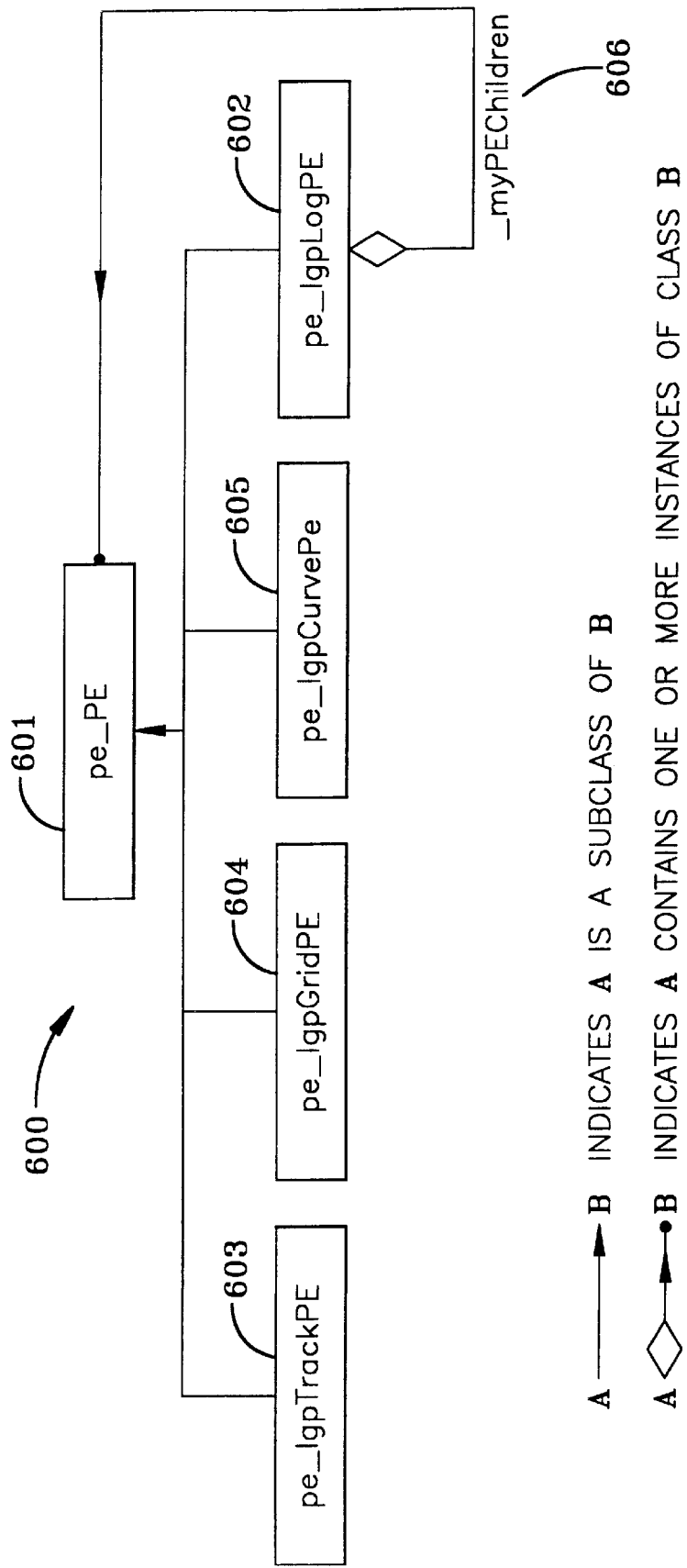
FIG. 6 shows an object-oriented design representation of the presentation editor using the Composite design pattern in accordance with the present inventive concept.

Turning now to FIG. 6, an object-oriented design representation of the PE using the Composite design pattern 600 in accordance with the present inventive concept is shown. The PE class design hierarchy is modeled 600 using the Composite design pattern (Gamma et al) with the class diagram. The pe_PE 601 base class presents a common functional interface for all presentation editors—be it a log PE (pe_IgpLog 602) that is used by an application, or a track (pe_IgpTrackPE 603), grid (pe_IgpGridPE 604), or curve (pe_IgpCurvePE 605) PE that is used by the log PE. The log PE class (pe_IgpLogPE 602) is a "composite" subclass of pe_PE 601. That is, an instance of class pe_IgpLogPE 602 contains one or more instances of a derived subclass of pe_PE 601, stored as its _myPEChildren member 606. The PEs of all other LGP UDCs, like pe_IgpTrackPE 603, pe_IgpGridPE 604, or pe_IgpCurvePE 605 are "leaf" pe_PEs 601. The "leaf" PEs do not contain any other pe_PEs 601. A single Log PE (pe_IgpLogPE 602) instance manages all types of LGP UDC objects within a presentation, like Tracks (Igp_Tracks), Curves (Igp_Curves), and Grids (Igp_Grids). At any given time, however, the PE will allow the user to edit only one type of LGP UDC objects. Depending upon the object-type being edited, the pe_IgpLogPE 602 will control one or more instances of "child PEs" (for example, pe_IgpTrackPE 603, pe_IgpGridPE 604, or pe_IgpCurvePE 605). Each child PE instance allows the user to edit a single IgpUDC object in the application's graphical presentation.

Figure 7:
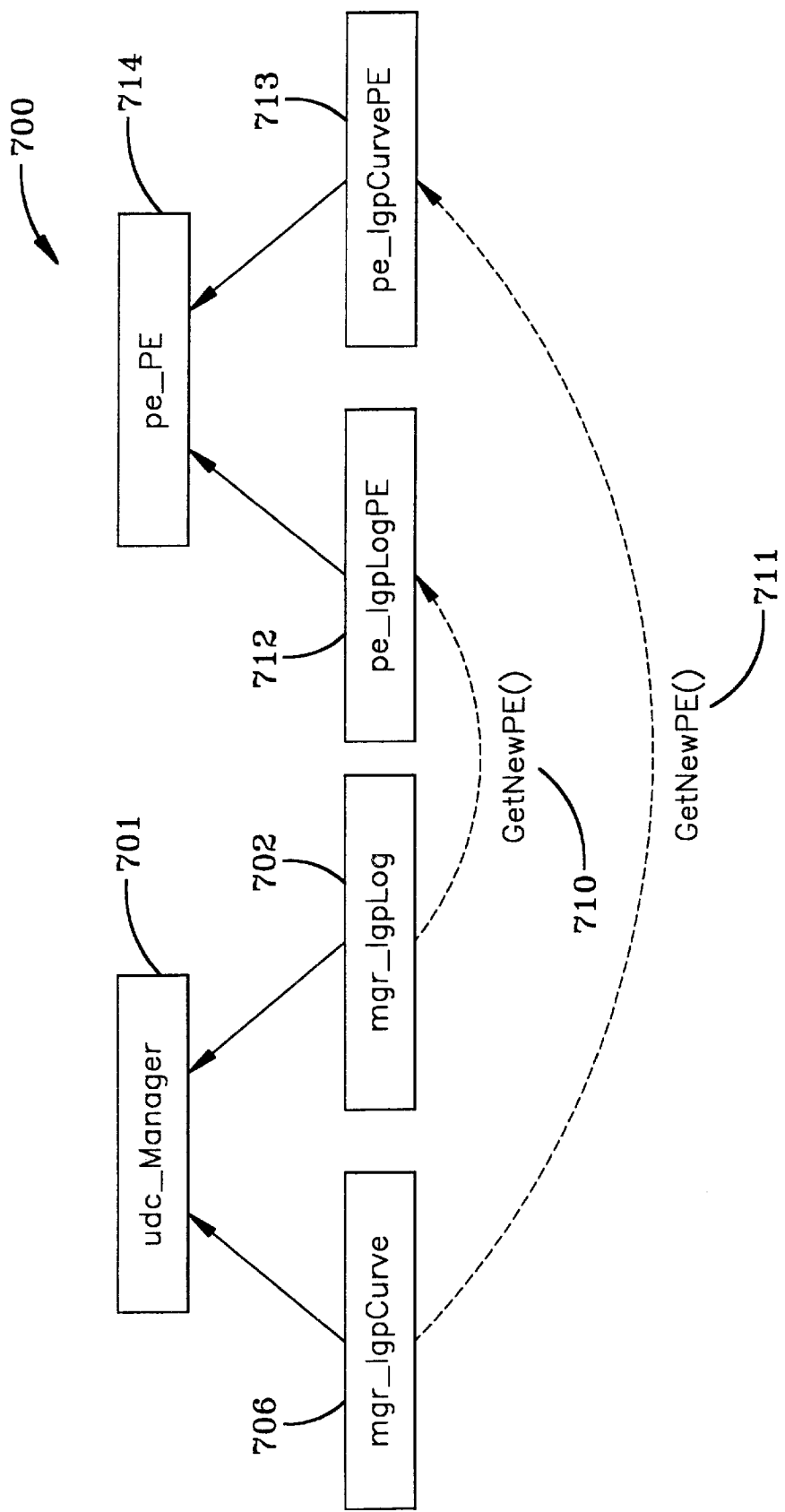
FIG. 7 shows the dependencies between the presentation editor and the User Defined Class (UDC) object managers in accordance with the present inventive concept.

Turning now to FIG. 7, the dependencies between the PE and the UDC object managers 700 in accordance with the present inventive concept are shown. The udc Manager 701 C++ class presents a common public interface to its users to create a new PE for a given graphical object. The udc_Manager 701 is an abstract base class, and one of its interface functions is GetNewPE( ) 710 and 711, which returns a PE based upon the object type the client selected. Any client of the udc_Manager 701 can use GetNewPE( ) 710 and 711 to create a new PE instance based upon the object type selected by the client. Any client (software application) can use the udc_Manager 701 to obtain a PE for a graphic object belonging to a particular class by sending a GetNewPE( ) 510–513 request to that class's udc_Manager subclass (such as mgr_IgpLog 702 and mgr_IgpCurve 706). For example, a client can invoke the GetNewPE( ) request on an instance of class mgr_IgpLog to obtain an instance of class pe_IgpLogPE (the PE subclass for the Igp_Log UDC). Whereas if the client needs a PE for an Igp_curve UDC, the client needs to invoke the GetNewPE( ) request on an instance of class mgr_IgpCurve.

The C++ class headers for udc_Manager class 701 of FIG. 1 are shown in

TABLE 1

```
class udc_Manager
{
public:
    . . .
    virual pe_PE *
    GetNewPE(lgp_GraphicObject * ObjH) ;
    . . .
};
class mgr_lgpCurve : public udc_Manager
{
public:
    . . .
    virtual pe_PE *
    GetNewPE(lgp_GraphicObject * ObjH);
    . . .
};
class mgr_lgpLog : public udc_Manager
{
public:
    . . .
    virtual pe_PE *
    GetNewPE(lgp_GraphicObject * ObjH);
    . . .
};
```

The corresponding implementations of GetNewPE( ) member are shown in Table 2.

TABLE 2

```
pe_PE *
udc_Manager::GetNewPE(lgp_GraphicObject * ObjH)
{
    return (pe_PE *) 0; // udc_manager subclasses need to provide
the implementation
}
pe_PE *
mgr_lgpCurve::GetNewPE(lgp_GraphicObject * ObjH)
{
    return (pe_PE *) new pe_lgpCurvePE(ObjH);
}
pe_PE *
mgr_lgpLog::GetNewPE(lgp_GraphicObject * ObjH)
{
    return (pe_PE *) new pe_lgpCurvePE(ObjH);
}
```

The mechanism by which a client could obtain a udc_Manager appropriate for a graphic object could be part of the public interface of that graphic object's implementation class itself. For example, if the graphic object is of type Igp_Curve 713 as shown in FIG. 7, and if all graphic objects belong to the base class Igp_GraphicObject, then the C++ class headers may be as shown in Table 3.

TABLE 3

```
class lgp_Curve : public lgp_GraphicObject
{
public:
    . . .
    virtual udc_Manager *
    GetManager(void);
    . . .
};
```

The corresponding implementation of the Igp_Curve is shown in Table 4.

TABLE 4

```
udc_Manager *
lgp_Curve::GetManager(void)
{
    return (udc_Manager *) new mgr_lgpCurve;
}
```

Therefore, once a client (application or another C++ class) understands any Igp_GraphicObject implementation, it only needs to write the code shown in Table 5 in order to access the object's PE.

TABLE 5

```
lgp_GraphicObject* anObj;
. . .
pe_PE * ObjPE = anObj—>GetManager()—>GetNewPE(anObj);
. . .
```

In the PE utility software implementation, the udc_Manager( ) mechanism is being used by both the clients of the PE as well as the internal implementation of PE itself. The client application only needs to invoke the PE on one or more Igp_Log graphic objects. In the Log PE implementation, the pe_IgpLogPE, in turn, looks for all the LGP graphics objects contained within it. Inside the implementation of pe_IgpLogPE, depending upon the PE mode (like Track mode, or Grid mode, or Curve mode) the pe_IgpLogPE gets a handle all the LGP graphic objects of that type, gets their udc_Manager and invokes GetNewPE( ) on them.

Table 6 shows the current LGP UDC object types that can be contained inside a log track and are currently supported in the present invention. An object type refers to a description of the behavior of an object of a certain kind, like logs, tracks or curves.

TABLE 6

| | |
|---|---|
| 2D Image | Image for 2D array. |
| Area Shading | User defined area shading bounded by curves and/or track boundaries. |
| Bengston | Bengtson Plot |
| Boundary | Cycles Boundary |
| Core Data Trace | Data values from core data plotted as a symbol trace. |
| Core Description | Core description text. |
| Core Image | Displays core images of tiff format files loaded with ASCII loader. |
| Core Section | Zone representing the interval from which the core samples were taken. |
| DEFT Bubble Count Images | Bubble CountImages from DEFT (FlowView) tool |
| DEFT Bubble Count Half Image | Bubble CountImages Section for Horizontal Well Presentation from DEFT (FlowView) tool |
| DEFT Cross Sections | Water hold up BH section profile from DEFT (FlowView) tool |
| DEFT Hold-Up Images | Holdups Image from DEFT (FlowView) tool |
| DEFT Hold-Up Half Images | Holdups Image Section for Horizontal Well Presentation from DEFT (FlowView) tool |
| Depth/Time Number | Index numbers for increments of depth or time. |
| Dip Dispersion | Dip Dispersion display (Sediview output). |
| Dip Fast Channels — FMI | The 8 dip fast channel arrays used in the FMI-based dip computation. |
| Dip Fast Channels — FMS2 | The 8 dip fast channel arrays used in the FMS2-based dip computation. |
| Dip Fast Channels — FMS4 | The 8 dip fast channel arrays used in the FMS4-based dip computation. |
| Dip Fast Channels — HDT/DIPLOG | The 4 dip fast channel arrays used in the DIPMETER-based dip computation. |
| Dip Fast Channels — OBDT | The 4 dip fast channel arrays used in the OBDT-based dip computation. |
| Dip Fast Channels — SHDT | The 8 dip fast channel arrays used in the SHDT-based dip computation. |
| Elan Volume | Volumetric display created from the outputs from the Elan module. |
| Events | Time-valued Event Data Items. |
| Facies display | Facies display. |
| FanPlot | Dip fans show the azimuth of plotted dips over intervals defined by the user. |
| Fast Channels — FMI | The 192 fast channel image arrays available from the FMI. |
| Fast Channels — FMS2 | The 54 fast channel image arrays available from the FMS2. |
| Fast Channels — FMS4 | The 64 fast channel image arrays available from the FMS4. |
| Flow Profile | Oil, Water, Gas flowrates along the BH |
| Fracture Detection | Fracture logs (BorTex fracture detection phase output) |
| GeoMarkers | A symbol representing the surface from which the surface type were recognized. |
| GeoLithos | A zone representing the interval from which the lithology were recognized. |
| Grid — index | Index grid lines for increments of index value. |
| Grid — linear | Grid lines for data displayed on a linear scale. Example: CALI |
| Grid — logarithmic | Grid lines for data displayed on a logarithmic scale. Example: SFL |
| Grid — tangential | Grid lines for display of formation dip tadpoles. |
| Heterogeneity Cumulative Curves | Heterogeneity Cumulative curves display (BorTex heterogeneity phase output) |
| Heterogeneity Percentage Curves | Heterogeneity Percentage (BorTex heterogeneity phase output) |
| Image — Acoustic Tool | Images from the UBI/ATS/CBIL/CAST tools. |
| Image — ADN | Images from the ADN tool. |
| Image — Azimuthal Laterolog Tools | Images from the ARI/HALS tool. |
| Image — EMI Tool | Images from the EMI tool. |
| Image — FMI Tool | Images from the FMI tool. |
| Image — FMS2 Tool | Images from the FMS2 tool. |
| Image — FMS4 Tool | Images from the FMS4 tool. |
| Image — Pseudo 4 arms | Images from the 4 arm dipmeter tool. |
| Image — Pseudo 6 arms | Images from the 6 arm dipmeter tool. |
| Image — Pseudo OBDT | Images from the OBDT tool. |
| Image — Pseudo SHDT | Images generated from the SHDT fast channels. |
| Image — RAB | Images from the RAB tool. |
| Image — STAR_AZ Tool | Images from the Western Atlas STAR_AZ tool. |
| Image — STAR_BUTTON Tool | Images from the STAR_BUTTON tool. |
| Layer Background Area | Layer Delineation Conductivities (BorTex layer phase output) |
| Layer Cumulative Curves | Layer Cumulative curves display (BorTex layer phase output) |
| Layer Percentage Curves | Layer Percentage display (BorTex layer phase output) |
| Litho Intervals and Markers | Displays the LithoIntervals and Markers. |
| Log Curve — block curve | A block representation of a log where the value changes at the sample rate. |
| Log Curve — constant | A straight line log curve drawn at a value determined by user. Example: bit size |
| Log Curve — plus left backup | Log curve with left backup shift mode. Example: SP (Spontaneous Potential) |
| Log Curve — plus right backup | Log curve with right backup shift mode. Example: GR (Gamma Ray) |
| Log Curve — shifted | Log curve with both left and right backup. Example: temperature |
| Log Curve — x 10 | Regular log curve plus x10 amplified log curve. Example: linear resistivity |
| Log Curve | Single trace log curve with no backup. |
| Mag/Azi Label | Dip magnitude & azimuth values displayed textually. |
| Min Max Conductivity | Heterogeneity Conductivity display (BorTex heterogeneity phase output). |
| PEx Lithology | Platform Express Lithology column. |
| Raw Quality Control | RawQc Severity (DimQC output). |
| RockCell | LithoFacies display (RockCell output). |
| RockClass | Lithologic display created from the outputs from the RockClass module. |
| SCAT Plot | Transverse and Longitudinal dip amplitude component plots. |
| Sedimentary Analysis | Sedimentary Analysis display (Sediview output). |
| Sinusoid | Sinusoid representations of dip values usually displayed on top of images. |
| Sonic Dot Log | A log of the maximum coherence of the ST plane for individual levels. |
| Sonic S/T Projection | A 2D contour plot of STC coherence value versus slowness and travel time. |
| Sonic VDL | Sonic wave train display where amplitude is represented as a shade of grey. |

TABLE 6-continued

| | |
|---|---|
| Sonic Waveform | Display of sonic waveforms. |
| SPRInt computations | Oil, Water, Gas flowrates along the BH computed by the SPRInt algorithm. |
| Station Log | Average value of a channel acquired vs. time at a stationary depth. |
| Stick Plot | Apparent dip displayed as stick for a user defined azimuth. |
| Summary Logs | Summary logs display created from the outputs of the Summary logs computation (BorTex summary computation phase output). |
| Symbol Trace | Trace used to display data values at sample points as a symbol. |
| Tadpole — Borehole Drift | Tadpole display of inclinometry data. |
| Tadpole — Quality Control | TadQc Severity (DimQC output). |
| Tadpoles — Classification | Dip Classification (Sediview output) |
| Tadpoles — Filtered Dips | Filtered dips display |
| Tadpoles — Filtered by Seq Dips | Dip filtering based on LGC matching technic (Sediview output) |
| Tadpoles — Local Curvature Axis | Local curvature axis (Sediview output) |
| Tadpoles — Structural Dips | Structural dips display |
| Tadpoles — Structural dip removed | Structural dip removed (Sediview output) |
| Tadpole | Dip tadpoles. |
| Text Data | Displays indexed text strings. |
| Value Curve | Displays curve values as text strings at user defined intervals. |
| WellSketch | Displays well sketch showing tubing, packers, casing and other components. |

Figure 8:
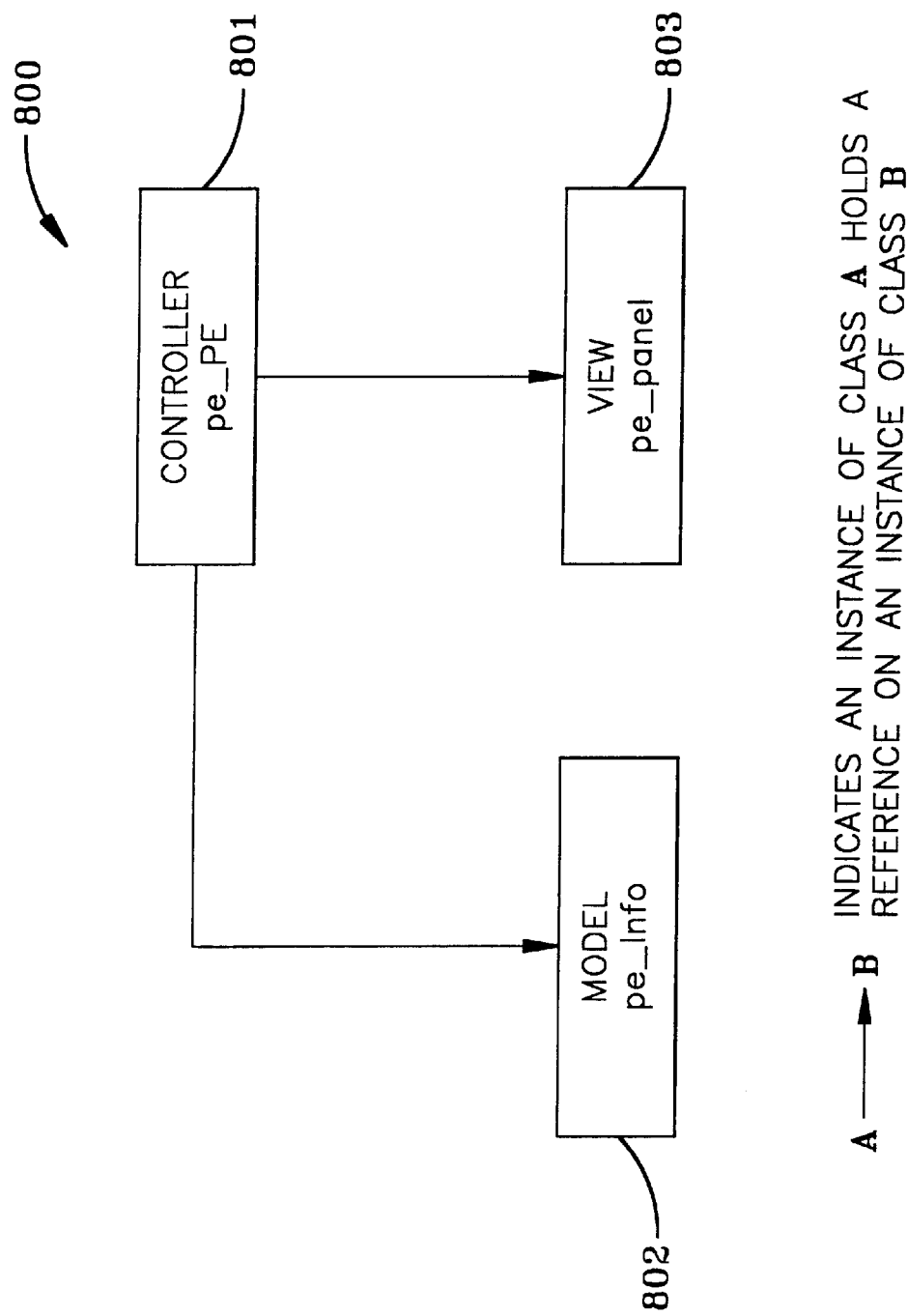
FIG. 8 shows an object-oriented design representation of the presentation editor using the Model-View-Controller design pattern in accordance with the present inventive concept.

Turning now to FIG. 8, an object-oriented design representation of the PE using the Model-View-Controller design pattern 800 in accordance with the present inventive concept is shown. The PE interface is implemented using an aggregate of three cooperating classes, very similar to the Model-View-Controller abstraction be (Gamma et al): the pe__PE class 801 is the one that the application deals with. It holds references to object instances of two helper classes, pe__Info 802 and pe Panel 803. The pe__Info class 802 serves as a cache for the editable attributes in a pe__PE object instance 801. The pe__Panel 803 is the abstraction of the human-interface for the editor. The user sees only the graphical human interface displayed on the screen by the pe__Panel 803 objects.

Figure 9:
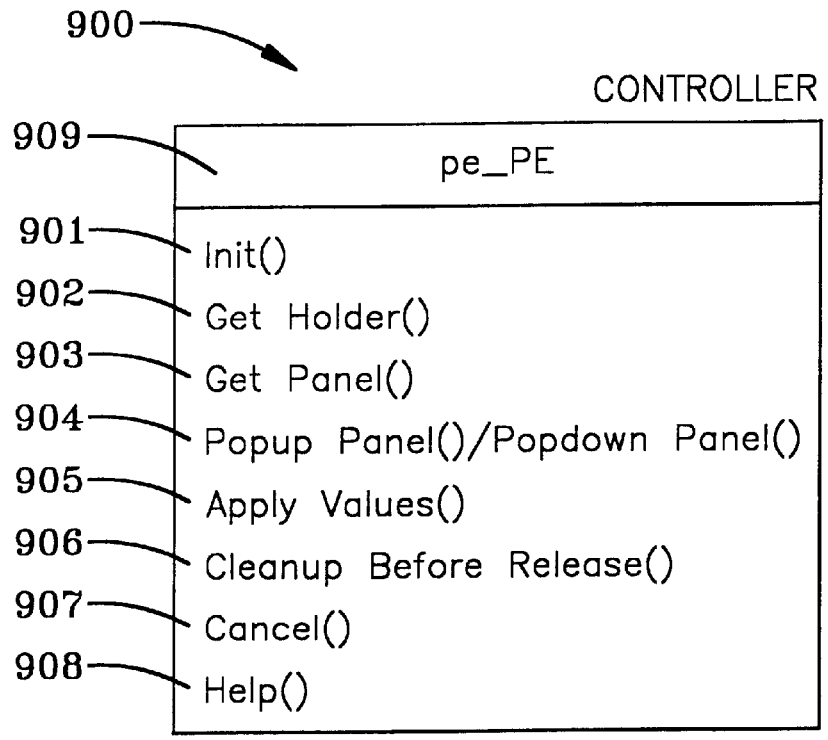
FIG. 9 shows an object-oriented design representation of the pe_PE 801 class (as shown in FIG. 8) of the presentation editor using the Model-View-Controller design pattern in accordance with the present inventive concept.

Turning now to FIG. 9, an object-oriented design representation of the pe__PE 801 class (as shown in FIG. 8) of the PE using the Model-View-Controller design pattern 900 in accordance with the present inventive concept is shown. The pe__PE 909 of FIG. 9 is the "controller". It provides the public interface to the PE. It's most prominent interface functions include: Inito 901—initialize the editor; GetHoldero 902—creates the pe__Info cache for the graphic object; GetPanelo 903—creates the human interface panel; PopupPanel/PopDownPanel( ) 904—popup or popdown the PE panel; ApplyValues( ) 905—apply the user edits to the graphic objects; CleanupBeforeRelease( ) 906—cleanup the PE and free resources; Cancel( ) 907—respond to user hitting 'Cancel' in the human interface; and Help( ) 908—pop up the appropriate page in the user guide.

Figure 10:
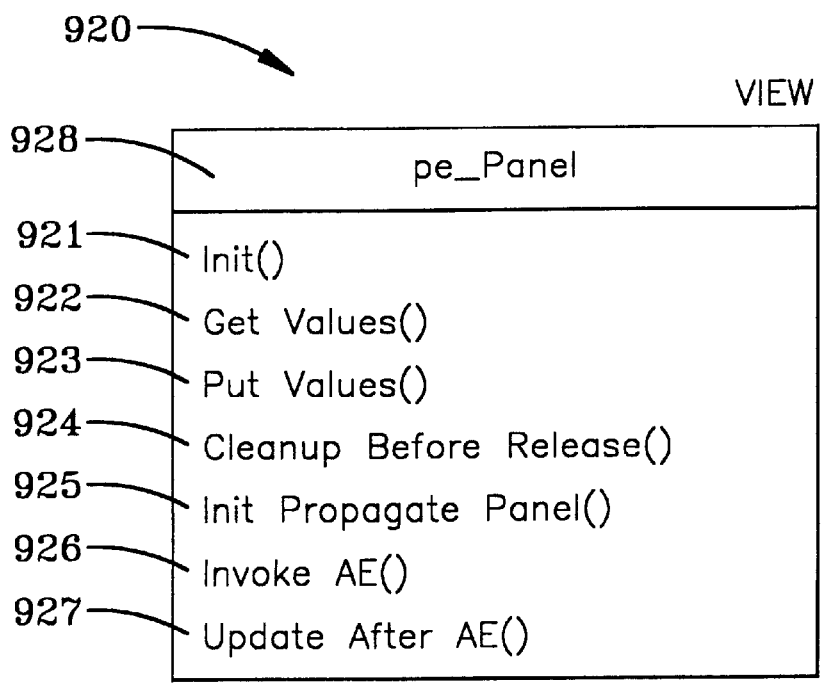
FIG. 10 shows an object-oriented design representation of the pe_Panel 803 class (as shown in FIG. 8) of the presentation editor using the Model-View-Controller design pattern in accordance with the present inventive concept.

Turning now to FIG. 10, an object-oriented design representation of the pe__Panel 803 class (as shown in FIG. 8) of the PE using a Model-View-Controller design pattern 920 in accordance with the present inventive concept is shown. The pe__Panel 928 is the "view" or human-interface. It handles updates from the "model" (or "cache") to the panel and vice versa. Its most prominent interface functions include: Init( ) 921—initialize the human-interface; GetValues( )922—obtain user settings from the human-interface and update the 'current' values; PutValues( ) 923—put current cache values into the human-interface CleanupBeforeRelease( ) 924—cleanup and free resources; InitPropagatePanel( ) 925—initialize the propagate panel; InvokeAE( ) 926—Open the full attribute editor for that UDC; and UpdateAfterAE( ) 927—Update attributes in the PE after AE has been closed.

Figure 11:
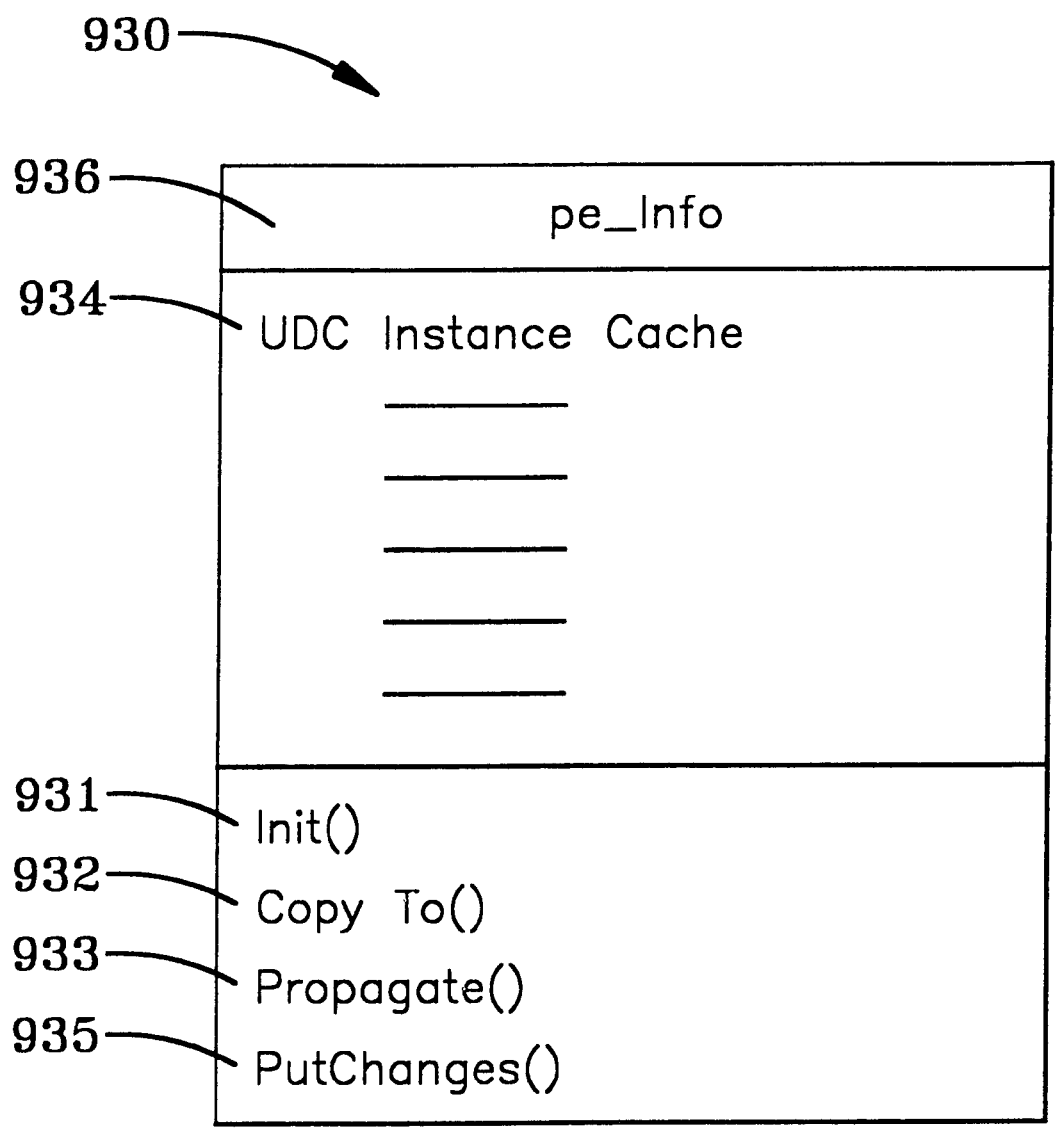
FIG. 11 shows an object-oriented design representation of the pe_Info 802 class (as shown in FIG. 8) of the presentation editor using the Model-View-Controller design pattern in accordance with the present inventive concept.

Turning now to FIG. 11, an object-oriented design representation of the pe__Info 802 class (as shown in FIG. 8) of the PE using the Model-View-Controller design pattern 930 in accordance with the present inventive concept is shown. The pe__Info 936 is the "model" or "cache" class. It creates a cache from the UDC handle, and mediates the updates from the cache back to the UDC handle. Its most prominent interface functions include: Init( ) 931—initialize the cache; CopyTo( ) 932—copy the cache contents to another cache; PropagateTo( ) 933—propagate the current cache values to another; UDC instance's cache 934; and PutChanges( ) 935—update the graphic display based on current cache values.

Figure 12:
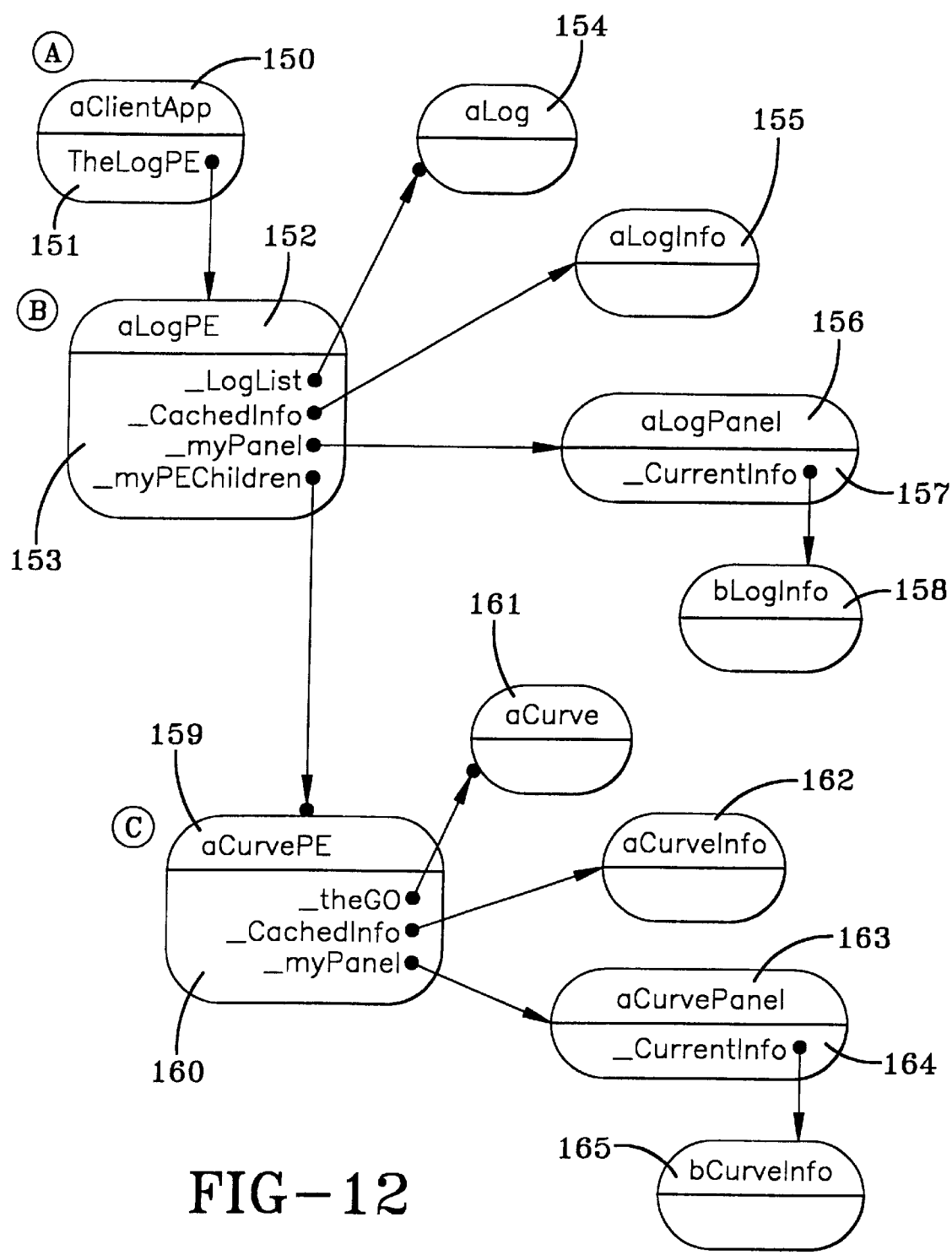
FIG. 12 shows the dependencies between the log graphics presentation editor parent and a child presentation curve editor in accordance with the present inventive concept.

Turning now to FIG. 12, the dependencies between a client application aclientapp 150, a PE parent and a child presentation curve editor in accordance with the present inventive concept. FIG. 12 illustrates the implementation details of both the Composite as well as the Model-View-Controller (MVC) design pattern object instances. It depicts the interconnections between (1) an Igp Application client object instance, (2) a pe__IgpLogPE object instance which is at the same time a composite instance as well as a controller (in an MVC aggregate) instance, and (3) a pe__IgpCurvePE object instance which is a component contained by the pe__IgpLog PE composite parent. FIG. 12 shows a snapshot of the Log PE in the Curve mode. While the user is editing a number of Igp__Curve objects, the pe__IgpLogPE controls a number of pe__IgpCurvePEs, one for each curve object being edited. The object snapshot notation being followed in FIG. 12 is based on the one used in Gamma et al. A rounded box with a horizontal line signifies a run-time object. The horizontal line separates the object name above from the object references below. A solid directional line represents an object reference. A filled dot at the end of an arrow represents one or more objects being referenced.

FIG. 12 can be divided into three regions, named A, B, and C, as indicated. Region "A" depicts the client interface to the PE utility. Region "B" depicts the pe__IgpLogPE with the "composite" aspect of the design where it is responsible for managing all the "component" or "child" pe__PEs as well as its aggregate of cooperating classes. Region "C" depicts a "component" (or child) pe__PE responsible for editing a single UDC object, in this case, a single Igp__Curve UDC instance.

In Region A, a client application object named aClientApp 150 has created a pe__IgpLogPE object aLogPE 152 and maintains a reference to it in the form of TheLogPE 151. In Region B: The aLogPE 152 knows which Igp__Log UDCs it is supposed to manage. It maintains the following references shown in block 153:

\_\_LogList: Handle on one each Igp\_Log handle being managed by aLogPE 152, aLog 154 being an instance of class Igp\_Log;

\_\_CachedInfo: a reference to a "cache" of its last saved state in the form of an pe\_IgpLogInfo object named aLogInfo 155;

\_\_myPanel: An pe\_IgpLog Panel object named aLog Panel 156 associated with the pe\_IgpLogPE instance aLogPE 152; and \_\_myPEChildren: An array of aLogPE's 152 pe\_PE children. pe\_IgpLogPE is a Composite sub-class of pe\_PE, therefore it contains one or more instances of "components" of type pe\_PE (Gamma et al).

The pe\_IgpLog Panel instance named aLog Panel 156 which is cooperating with the pe\_IgpLogPE instance named aLogPE 152 maintains a reference on the current "state" of the pe\_IgpLog Panel user-interface blogInfo 158. The state of a pe\_IgpLogPE class instance, as we mentioned above, is represented by an appropriate subclass of pe\_Info. And since the appropriate sub-class of pe\_Info baseclass that stores the state of a pe\_IgpLogPE is the pe\_IgpLogInfo class, the \_\_CurrentInfo 157 reference in aLogPanel 156 points to an instance of pe\_IgpLogInfo named bLogInfo 158.

Thus we see in Region B of this run-time snapshot, the C++ object instances aLogPE 152(of class pe\_IgpLogPE), aLogInfo 155 (of class pe\_IgpLogInfo), aLogPanel 156 (of class pe\_IgpLogPanel), and bLogInfo 158 (of class pe\_IgpLogInfo) all are cooperating to provide the behavior of aLog PE 152. This is a standard feature for all Model-View-Controller type programming constructs (See Gama et al.) All subclasses of pe\_PE aggregates follow the same scheme of cooperation.

In Region C, if the Log PE is in Curve mode, the pe\_IgpLogPE's\_myPEChildren will point to an array of pe\_IgpCurvePE children. The object aCurvePE 159 stands for an element in this array of pe\_IgpCurvePE children. Each child PE like the aCurvePE 159 maintains the following references shown in block 160:

\_\_theGO: Handle on the Igp\_GraphicObject being edited by aCurvePE 159. In this case, aCurve 161 is an instance of class Igp\_Curve since the PE utility is supposed to be in the Curve mode.

\_\_CachedInfo: Last saved "state" of the pe\_IgpCurvePE (aCurveInfo 162).

\_\_mypanel: Handle on the pe\_IgpCurvePanel object (aCurvePanel 163).

The pe\_IgpCurvePanel instance named aCurvePanel 163 maintains a reference on the current "state" of the pe\_IgpCurvePanel user-interface. In particular, the \_\_CurrentInfo 164 reference in aCurvePanel 163 points to an instance of pe\_IgpCurveInfo named bCurveInfo 165.

Figure 13:
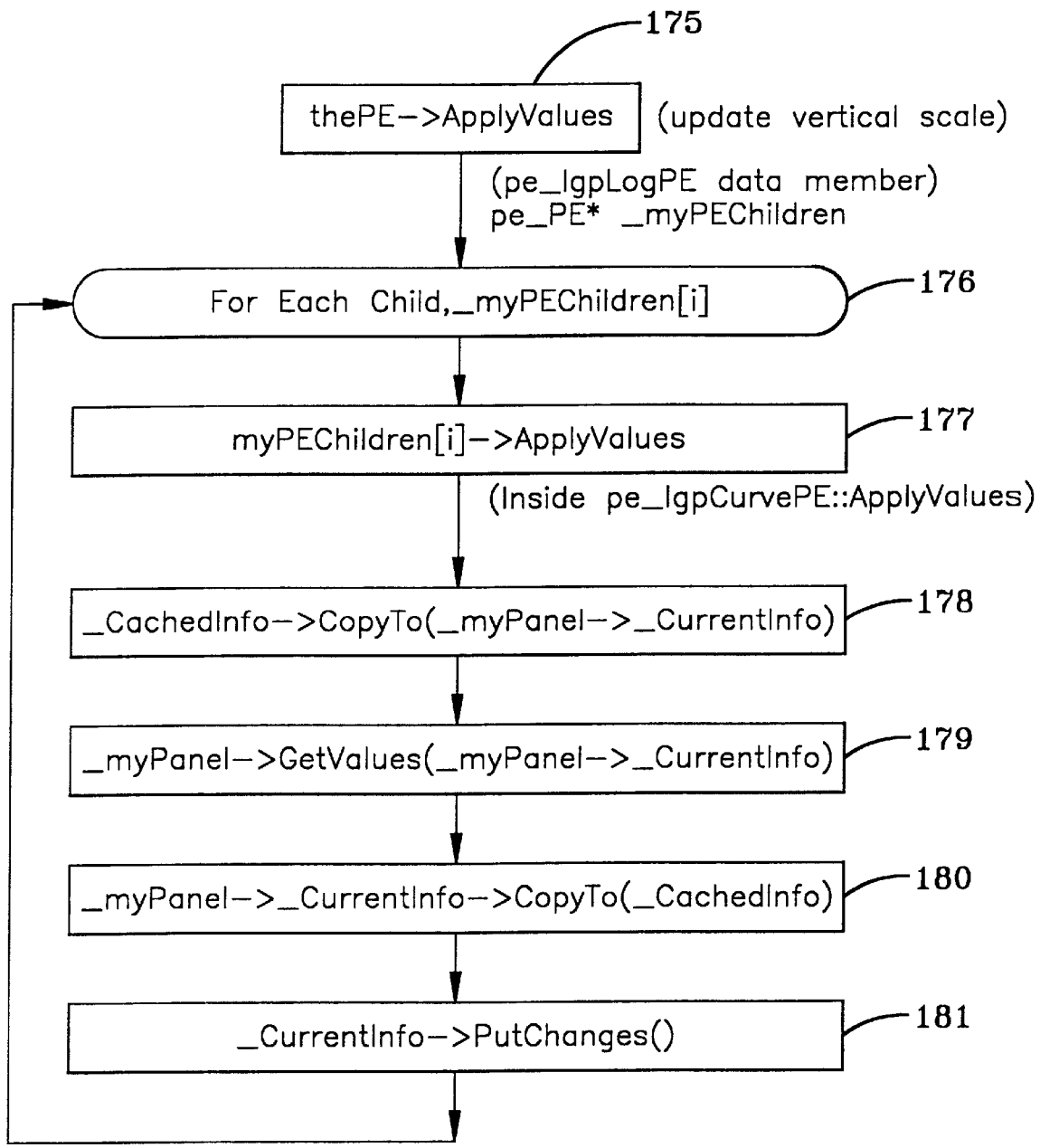
FIG. 13 is flowchart for applying values in the curve presentation editor in accordance with the present inventive concept.

Turning now to FIG. 13, a flowchart for applying values in the curve PE in accordance with the present inventive concept is shown. FIG. 13 shows the PE aggregate class interactions during run-time. The run-time objects described above are used along and the object interactions which happen during a typical user action like when a user hits the "Apply" button in a Log PE are enumerated. FIG. 13 depicts the actions in the form of a flowchart. The activate callback of the Apply button in the Log PE user-interface invokes the ApplyValueso member function 175 on the aLogPE object instance. Since aLogPE is an instance of class pe\_IgpLogPE, this calls the pe\_IgpLogPE::ApplyValues( ) member function of class pe\_IgpLogPE. For each child, \_\_myPEChildren[i] 176, the following actions take place inside pe\_IgpLogPE::ApplyValues( ) of the aLogPE 177 (in this instance inside pe\_IgpCurvePE::Apply Values):

aLogPE (152 in FIG. 12) invokes Copy to( ) on its\_ cachedInfo member (aLogInfo 155) and passes into it the pe\_Panel instance's\_CurrentInfo (157 in FIG. 12).

aLogPE invokes GetValues( ) on aLogPanel 179. GetValues( ) is a virtual function in all pe\_Panel classes that updates the pe\_Panel instance's \_\_CurrentInfo to reflect the "current state" of the user-interface. In particular, the aLogPE's (152 in FIG. 12) invocation of GetValues( ) on aLogPanel (156 in FIG. 12) causes bLogInfo (158 in FIG. 12) to reflect the new user settings made by the user in the aLogPanel's user-interface.

As shown in FIG. 13, Vertical Scale is the only Igp Log attribute editable from the Log PE. The aLogPE then calls pe\_IgpLogInfo::PutChanges( ) 181 using the new vertical scale value (if different). This updates the vertical scale for all the graphical objects contained in the Igp\_Log being edited.

The next responsibility of the aLogPE is to sequentially invoke ApplyValues( ) on each member of its array of pe\_PE "children" in the \_\_myPEChildren 176. Since we're in Curve PE mode the object type being edited is Igp\_ Curve. Therefore, the control enters the pe\_IgpCurvePE::ApplyValues( ) function for each aCurvePE instance 177. Inside pe\_IgpCurvePE::ApplyValues( ) 177, for each aCurvePE, we first copy the \_\_CachedInfo of the pe\_IgpCurvePE into its \_\_myPanel's \_\_CurrentInfo 178. This way, any attributes that were not changed by the editor get set to the original (or last saved) values. pe\_IgpCurvePE::ApplyValues( ) then perform GetValueso 179 on aCurvePanel to get the current curve attributes into bCurveInfo (165 in FIG. 12) instance. Next updated is the aCurveInfo (aCurvePE's\_CachedInfo) by copying\_ myPanel's\_CurrentInfo (bCurveInfo) 178 onto aCurveInfo using pe\_IgpCurveInfo::CopyTo( ) 180. Note that CopyTo( ) is a public virtual member function of the pe\_Info baseclass, and it will have to be overloaded in the pe\_IgpCurveInfo class implementation to suit the editing needs of the Igp\_Curve graphics object. Finally have aCurveInfo be written back to the graphics object aCurve doing pe\_IgpCurveInfo::PutChanges( ) 181. Again, note that PutChanges( ) 181 is a public virtual member function of the pe\_Info baseclass, and it will have to be overloaded in the pe\_IgpCurveInfo class implementation to suit the editing needs of the Igp\_Curve graphics object.

Although the present invention has been described in considerable detail with reference to certain preferred embodiments thereof, other embodiments are possible. Therefore, the spirit and scope of the appended claims should not be limited to the description of the preferred embodiments herein.

What is claimed is:

1. A computer-implemented method of editing the attribute values of object-oriented programming graphical objects in an oil-well log graphics display comprising the steps of:

a) providing a presentation editor computer display, with a spreadsheet-like graphical user interface (GUI) display and a set of command functions, the presentation editor is selected by a user from an oil-well display;

b) displaying multiple oil-well log graphical objects concurrently within the spreadsheet-like graphical user GUI display of the presentation editor;

c) displaying attributes of the multiple oil-well graphical objects within the spreadsheet-like graphical user GUI display of the presentation editor;

d) changing the attribute values of a graphical object in response to a user selecting the attribute to be changed and selecting a command from the set of command functions; and e) automatically applying the changed attributes to the multiple oil-well graphical objects, selected by the user, displayed within the presentation editor computer display, wherein user selected attributes are copied from a first graphical object to one or more target graphical objects displayed within the presentation editor computer display by the user first selecting the attributes of the first graphical object, selecting one or more target graphical objects, and using a command function, copying the attributes from the first graphical object to the selected target graphical objects.

2. A computer-implemented method, according to claim 1, wherein the multiple graphical objects are track object types.

3. A computer-implemented method, according to claim 2, wherein the track object type has attributes selected from the group consisting of track depth, track width, and track position.

4. A computer-implemented method, according to claim 2, further comprising saving user selected track object types and their attributes from a first oil-well log display, in response to a user selecting a save track command function within presentation editor computer display.

5. A computer-implemented method according to claim 4, further comprising building a new oil-well log graphics display by inputting saved track object types and their attributes into the presentation editor display in response to a user selecting an add track command function in the presentation editor computer display.

6. A computer-implemented method according to claim 4, further comprising adding saved track object types and their attributes to an existing oil-well log graphics display by using the presentation editor computer display in response to a user selecting an add track command icon.

7. A computer-implemented method, according to claim 3, further comprising the capability of automatically updating the attributes of multiple track object when the user changes the track depth, track width and track position attribute of one graphical object within the presentation editor computer display.

8. A computer-implemented method according to claim 1, wherein the command functions are represented on the presentation editor screen as icons and are selected from the group consisting of add track, import track, propagate, and save track.

9. A computer-implemented method according to claim 1, further comprising allowing a user to edit an entire oil-well log display consisting of log displays, tracks and user defined class graphical objects and their attributes in the spreadsheet-like graphical user interface within the presentation editor computer display.

10. A computer-implemented method according to claim 1, wherein the multiple graphical objects are grid object types.

11. A computer-implemented method according to claim 10, wherein the grid object type has attributes selected from the group consisting of orientation, type, line thickness, and line increment.

12. A method of editing the attributes of an oil-well graphical object in an object-oriented computer program running on a computer processor, the method comprising the steps of:

a. allowing multiple user defined class (UDC) graphical object types, each object type having associated attributes;

b. providing a presentation editor computer display for each oil-well gaphical object type, the presentation editor is selected by a user from an oil-well log display; and c. using each presentation editor, with a graphical user interface as an interface with a user, to allow the user to selectively create and modify the attributes of multiple UDC oil-well graphical objects of each object type within a single presentation editor display.

13. A method, according to claim 12, wherein:

a. graphical object types are selected from the group consisting of track, grid and curve object types; and b. each presentation editor is selected from the group consisting of a track presentation editor, a grid presentation editor and a curve presentation editor.

14. A method according to claim 13, wherein the curve type object type has attributes selected from the group consisting of curve type, curve data binding, curve scale and curve line.

15. A method, according to claim 12, wherein in the using step:

a. selectively creating and modifying the attributes of multiple graphical objects by the user selecting a first graphical object; and b. copying those attributes to one or more target graphical objects when the user selects a propagate command on the presentation editor computer display.

16. A method, according to claim 12, wherein in the using step:

a. selectively creating and modifying the attributes of multiple graphical objects by the user selecting a first graphical object; and b. copying those attributes to a target graphical object when the user selects an apply command on the presentation editor computer display.

17. A method, according to claim 12, further comprising the steps of:

a. allowing the user to save instances of graphical object types and their attributes;

b. allowing the user to input instances of saved graphical object types into the presentation editor display and add the instances of the graphical object types to existing graphical objects in the presentation editor display; and c. allowing the user to input instances of the saved graphical object types in the presentation editor's graphical user interface to build a new display of graphical objects in the presentation editor display.

18. A method, according to claim 12, wherein the attributes of a graphical object are changed in response to a user selecting the attribute and selecting a command from a set of command icons.

19. A system for creating, editing and archiving the attribute values of an oil-well graphical object comprising a specially programmed computer having:

a. memory means for storing:

i. a user defined class graphics library of oil-well objects, each object in the user defined class graphics library of graphical objects having a plurality of attribute values;

ii. a database for archiving instances of graphical object types and their attribute values;

iii. an application software program with an interface to the user defined class graphics library of objects and the database;

b. processor means for
   i. generating the user defined class graphics library of oil-well objects using the application software program and displaying the instances of the graphical object types stored in the database on a display;
   ii. running a presentation editor that interfaces with the application software program, the user defined class graphics library of objects and the database; and c. a graphical user interface means for
   i. displaying multiple instances of oil-well graphical object types on a spreadsheet type display within a presentation editor computer display;
   ii. allowing the user to selectively create and modify the attribute values for multiple instances of oil-well graphical object types of the same object type within a single presentation editor computer display.

* * * * *